United States Statutory Invention Registration [19]

[11] Reg. Number: H119

Keeton et al. [45] Published: Sep. 2, 1986

[54] PASSIVE EMERGENCY CORE COOLING SYSTEM FOR A LIQUID METAL FAST BREEDER REACTOR

[75] Inventors: Alvin R. Keeton, Union Township, Washington County; Michael G. Down, Plum, both of Pa.

[73] Assignee: The United States of America as represented by the United States Department of Energy, Washington, D.C.

[21] Appl. No.: 783,335

[22] Filed: Oct. 3, 1985

Related U.S. Application Data

[63] Continuation of Ser. No. 514,213, Jul. 15, 1983.

[51] Int. Cl.[4] ..... G21C 15/18

[52] U.S. Cl. ..... 376/299; 165/96

[56] References Cited

U.S. PATENT DOCUMENTS

| | | | |
|---|---|---|---|
| 3,127,322 | 3/1964 | Dodd . | |
| 3,246,634 | 4/1966 | Stevens | 165/96 HV |
| 3,369,971 | 2/1968 | Kagi | 376/247 X |
| 3,602,004 | 8/1971 | Peavler | 165/96 HV |
| 3,718,539 | 2/1973 | West et al. . | |
| 3,823,305 | 7/1974 | Schroder | 165/96 HV |
| 3,907,026 | 9/1975 | Mangus | 165/70 |
| 3,935,063 | 1/1976 | Dunckel | 165/105 X |
| 3,968,653 | 7/1976 | Cachera | 376/298 |
| 3,968,653 | 7/1976 | Cachera | 60/644 |
| 3,984,282 | 10/1976 | Kleimola . | |
| 4,057,465 | 11/1977 | Thompson et al. . | |
| 4,099,554 | 7/1978 | Haese | 516/247 X |
| 4,161,212 | 7/1979 | Hightower | 165/96 HV |
| 4,191,246 | 3/1980 | Cassel | 165/134 |
| 4,216,821 | 8/1980 | Robin | 165/70 X |
| 4,322,267 | 3/1982 | Kinoshita et al. | 376/299 |
| 4,362,694 | 12/1982 | Kayser | 376/298 |
| 4,382,907 | 5/1983 | Robin | 376/229 X |

FOREIGN PATENT DOCUMENTS

| | | | |
|---|---|---|---|
| 0046696 | 4/1976 | Japan | 376/282 |
| 0145889 | 11/1979 | Japan | 376/298 |
| 0013796 | 8/1980 | European Pat. Off. | 165/70 |
| 0145891 | 11/1979 | Japan | 376/298 |
| 0055295 | 5/1979 | Japan | 376/299 |

OTHER PUBLICATIONS

Reaktortagung, pp. 909–912, 30 Mar. to 2 Apr. 1976.

Nuclear Engr. International, vol. 22, No. 257, May 1977, pp. 41–45.

*Primary Examiner*—David H. Brown

*Assistant Examiner*—Dan Wasil

*Attorney, Agent, or Firm*—James W. Weinberger; Robert J. Fisher; Judson R. Hightower

[57] ABSTRACT

A passive decay heat removal system in which gas pressurization of a gap between the double walls of heat exchanger tubes initiates heat removal by triggering an increase in tube heat conductivity.

9 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PASSIVE EMERGENCY CORE COOLING SYSTEM FOR A LIQUID METAL FAST BREEDER REACTOR

GOVERNMENT CONTRACT

This invention was conceived during performance of a U.S. Government Contract designated DE-AC02-77ET37201.

This is a continuation of application Ser. No. 514,213 filed July 15, 1983.

BACKGROUND OF THE INVENTION

The invention relates to an emergency core cooling system for either a pool or loop-type liquid metal fast breeder reactor (LMFBR).

The fuel core of a nuclear reactor continues to produce heat (called decay heat) for some time following shutdown. Removal of decay heat must be accomplished any time a nuclear reactor is shut down after operation in order to prevent overheating the fuel core. The amount of decay heat removal required depends on several factors. These include: the size, composition and quantity of fuel in the core, the length of time and power level during reactor operation and the particular design of the reactor. All commercial power reactors have primary and back-up systems for the purpose of removing the decay heat. In emergency situations such as a Loss of Cooling Accident (LOCA), loss of electrical power or control system malfunction, the decay heat removal system (DHRS) must continue to function.

There is a desire that the decay heat removal system must be passive (not requiring intelligent initiation) and highly reliable. Consequently, it is desired to provide an improved decay heat removal system.

SUMMARY OF THE INVENTION

The invention describes a novel emergency core cooling system to be used on either a pool or loop-type liquid metal fast breeder reactor. The system takes the form of one or more liquid metal loops which have coolant flow therethrough impelled solely by thermal convection between the hot core region and a cooler, liquid metal/air heat exchanger unit. An important feature of the invention is a double walled design of heat exchanger tubing which enables the system to operate in a passive mode during normal reactor operation, but to be rapidly switched into an active core cooling mode without the need for electrical power, operator action, or complex electronic equipment.

A small gap between the double walls of the tubes can be evacuated for normal reactor operation or pressurized with a gas, thereby increasing heat transfer across the gap and thereby initiating emergency core cooling via this system.

DESCRIPTION OF THE PREFERRED EMBODIMENT

Figure 1:
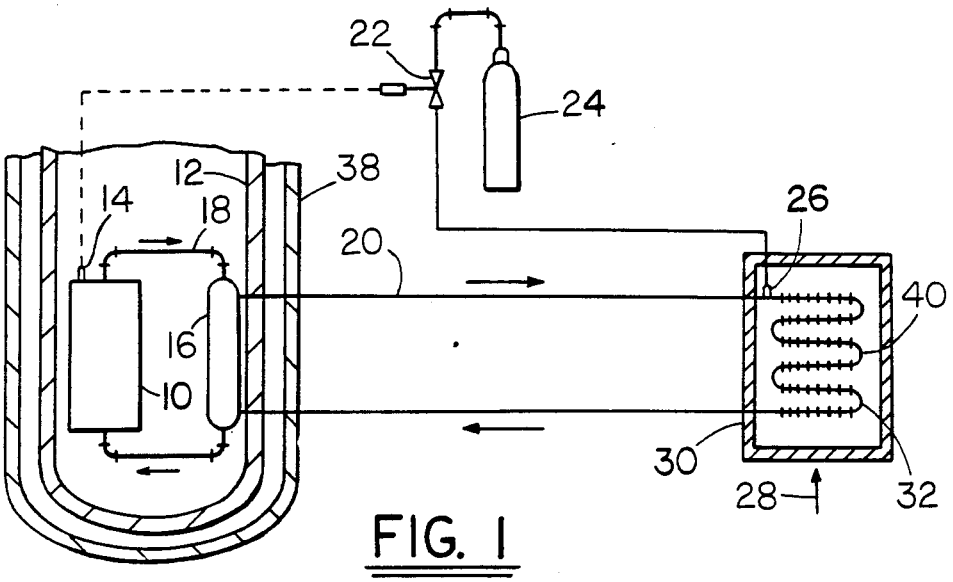
FIG. 1 is a schematic of the invented system.

The decay heat removal system described in this invention is shown schematically in FIG. 1, which has a nuclear core 10 with reactor vessel 12. The basic concept for heat removal is via a secondary liquid metal loop 18 which is coupled to an intermediate heat exchanger 16 within the primary containment structure 38. A liquid metal/air convective heat exchanger (CHX) 30 outside structure 38 is connected in parallel to exchanger 16 by liquid metal loop 20. Loop 20 has no pump, the liquid metal (e.g. Na) being circulated by thermal convection due to the temperature differential ($\Delta T$) between the intermediate heat exchanger 16 and the cooler convective heat exchanger 30. During normal reactor operation this $\Delta T$ is maintained at a low value, by restricting the degree of air cooling in the convective heat exchanger 30, and this results in a relatively slow liquid metal flow. Thus, under normal conditions, only minimal power generating capability is lost from the reactor. Under emergency cooling conditions, however, the $\Delta T$ is increased by increasing the degree of cooling in convective heat exchanger 30. This results in an increased thermal convection flow in the loop and the subsequent removal of a considerable amount of reactor decay heat. The essence of the present invention, concerns the means by which the degree of cooling in the convective heat exchanger can be rapidly and efficiently increased under emergency conditions without resource to operator initiative, electrical power or an electronic control system.

This goal is achieved by using specially constructed, double walled (or duplex) tubing 40 for convective heat exchanger 30. This type of tubing consists of two concentric tubes 44 and 46 which have been constructed such that only a very narrow sealed gap 36 exists between the outside surface of inner tube 46 and the inside surface of outer tube 44 (see FIGS. 3 and 4). In the convective heat exchanger 30 design this gap 36 can be either evacuated or pressurized with helium through a tube plenum region 34. Under normal reactor operation this intertube gap 36 will be kept evacuated, a condition which results in negligible heat transfer across the composite wall of the duplex tube. In this mode very little heat is removed by convective heat exchanger 30, the $\Delta T$ remains small and the power loss is minimal. In the event that the primary coolant should overheat in an emergency situation, a non-electrical temperature sensor 14 (see FIG. 1) will actuate gas-operated valves 22 to immediately pressurize intertube gap 36 of convective heat exchanger 30 with helium. The composite duplex tube wall thus becomes highly effective at transferring heat from the liquid metal to the surrounding air (see FIG. 2 for test results verifying the change in wall conductivity with gap pressure). The degree of cooling in convective heat exchanger 30 increases, as does the $\Delta T$, and, of course, the liquid metal flow and power removal rise accordingly.

Figure 3:
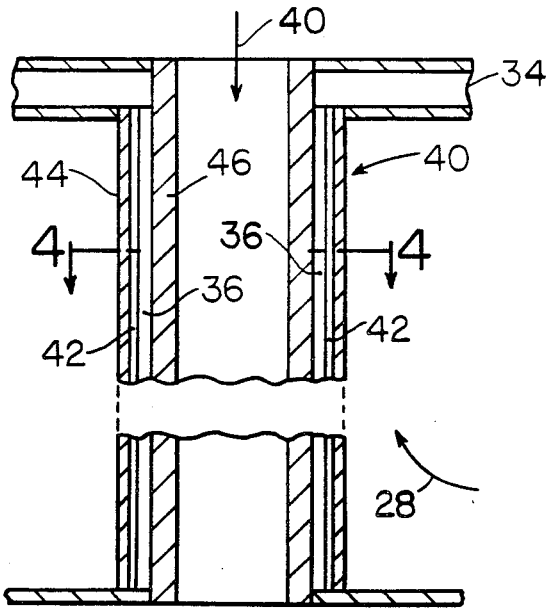
FIG. 3 is a schematic section of a heat transfer rod.

In FIG. 1, the sodium flow is shown schematically through loop 20. Within convective heat exchanger 30, the tube arrangement 32 is shown schematically, with an illustrative design in this component illustrated in FIG. 3. In FIG. 3, arrow 48 is the sodium flow through one tube 40, many of which would actually be used. Tube 40 is a composite of inner tube 46 within outer tube 44. Gap 36 is shown relatively large in FIG. 3, and communicates with distribution header 34 which will communicate with all tubes 40 and which leads to gas bottle 24 via gas valve 22 in FIG. 1. Arrows 28 in FIGS. 1 and 3 show air flow over the outer surfaces of tubes 44.

Item 14 in FIG. 1 is a sensor which controls valve 22. This sensor may be suitable for the detection of any reactor parameter considered indicative of a reactor condition requiring decay heat removal. For example, this includes reactor pressure.

Other gases besides helium can be used. Hydrogen is a possible substitute.

Figure 4:
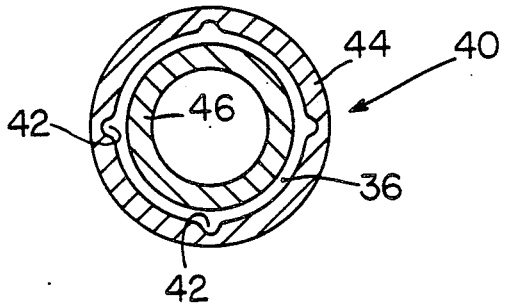
FIG. 4 is a schematic plan view of a heat transfer rod.

Refer to FIG. 4. The size of gap 36 has been increased for clarity in the drawings. In reality, this gap may be indiscernable to the unaided human eye. To enhance the speed of pressurization of gap 36, slots 42 may be milled in both outer and inner tubes 44 and 46, providing for passage of gas therethrough. These slots or channels extend axially along the length of the tubes.

In summary, then, the duplex tube of the convective heat exchanger 30 can be rapidly changed from an insulated barrier (evacuated state) to an excellent heat conductor (helium filled) by the simple activation of a non-electrical, non-manual automatic valve 22.

Features and Advantages

1. Does not require electricity for operation.
2. Operates automatically if the reactor temperature exceeds a preset level.
3. Easily tested in-situ.
4. Completely reversible, the heat rejection capability of the decay heat removal system can be turned on or off.
5. Only one active element (gas control valve 22).

Figure 2:
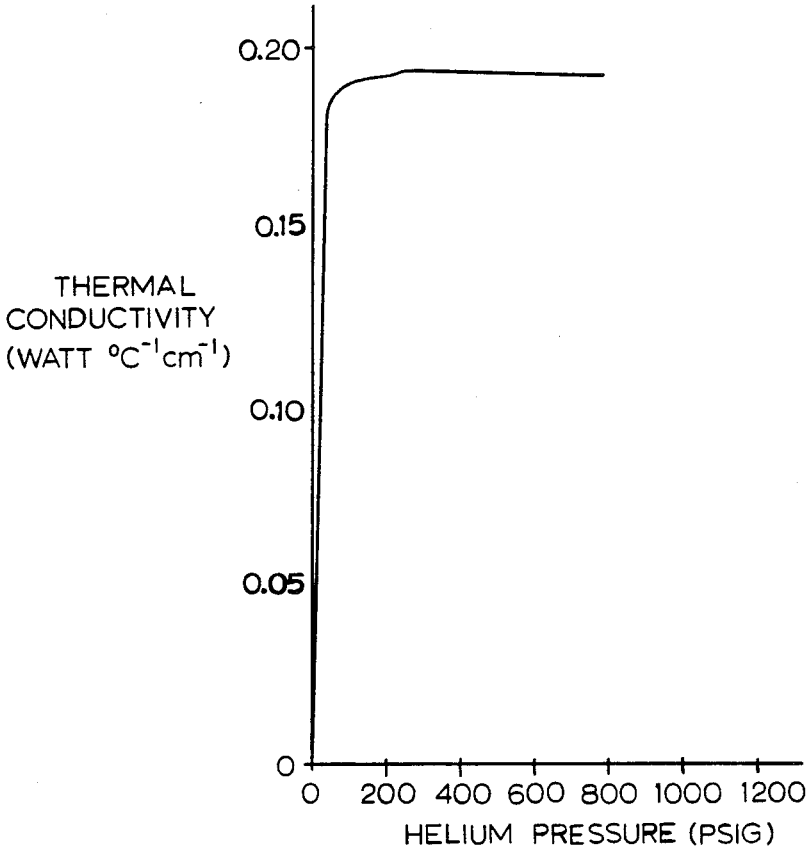
FIG. 2 is a graph of conductivity as gas pressure.

The feasibility of this invention has been verified experimentally using a sample of double walled heat exchanger tubing installed into a liquid sodium recirculation loop. Hot and cool sodium flows were set up through the bore and shell sides of the specimen in order to simulate the liquid metal/air heat exchanger of the subject invention. The effect on heat transfer of varying the environment in the intertube gap is clearly depicted in FIG. 2. When the gap was evacuated ($\approx 0$ psia) the effective thermal conductivity across the tube wall fell almost to zero (0.009 watt $°C^{-1}cm^{-1}$). In this mode, very little heat is lost through the heat exchanger unit of the emergency cooling system. The response to an increase in core temperature, however, was simulated in this test by closing the vacuum valve and pressurizing the intertube gap with helium. FIG. 2 shows that, at pressures greater than atmospheric, the thermal conductivity of the tube wall increased by more than an order of magnitude and remained relatively constant over a wide range of pressures. In this, the activated mode, the emergency cooling system is capable of efficiently transferring a large heat flux away from the reactor core.

Table 1 tabulates the design parameters of the tested specimen.

TABLE 1

| | |
|---|---|
| INNER TUBE | |
| Wall thickness | .121" |
| Outside Diameter | .653" to .667" |
| OUTER TUBE | |
| Wall thickness | .070" |
| Outside Diameter | .818" to .807" |
| INTERFACE GAP | .0001" to .0004" |
| GROOVES | 4, Full Length, 90° Apart |

Despite the presence of a finite gap between the two tubes of the double walled specimen, the effective thermal conductivity of the composite tube is virtually equivalent to that of a conventional single walled tube. The tube used for this verification experiment was not especially developed to give optimum behavior. It is believed that a relatively low value for the prestressing of the double wall is a necessary feature. It is expected that further testing of tube properties will result in even better performance in passive cooling system.

The use of a pressurized gas to increase the thermal conductivity of a double walled tube can be applied to heat sources other than nuclear reactors. It should be emphasized that the mechanism of the increase in conductivity across the gap between the tubes does not appear to be due to a transition from a non-heat-conducting vacuum to a heat conducting gas medium. Instead, some other phenomena appears to be responsible, as apparent from the large increase in the conductivity coefficient.

We claim:

1. A cooling system for removing heat from a heat source upon demand comprising:

(a) a heat source, (b) a coolant loop for circulating a liquid coolant through the heat source for removing heat from the source, (c) a heat exchanger in the coolant loop for removing heat from the coolant, the heat exchanger being constructed of duplex tubing having an inner tube for containing the flow of coolant and an outer tube concentric to the inner tube for rejecting heat to the environment, said outer tube being spaced from the inner tube to form a sealed annular gap therebetween to reduce heat conductivity between the inner and outer tubes, the coolant continuously flowing through the loop by thermal convection between the heat source and the relatively cooler heat exchanger, (d) a source of pressurized gas, including control means, connected to the sealed gap in the duplex tubing for providing thermally conductive gas to fill the gap, and (e) sensor means at the heat source for sensing a parameter indicative of a need for additional heat removal, said sensor means being connected to said control means for activating said control means to provide thermally conductive gas to the gap in the duplex tube to increase heat transfer between the tubes and reduce the temperature of the coolant thereby increasing the convective flow of coolant in the loop and increasing heat removal from the heat source.

2. The system of claim 1 wherein said gas is helium.

3. The system of claim 1 wherein said tubes have an axial slot on the gap side of the outer tube creating a path for gas pressurization of the gap.

4. The system of claim 1 wherein said sensor means is a temperature detector.

5. The system of claim 1 wherein said coolant is liquid sodium, said sensor means is a liquid sodium temperature detector, said heat exchanger is air cooled, and said coolant path receives coolant from a primary heat exchanger which is in fluid communication with said heat source.

6. The system of claim 1 wherein said gap is approximately 0.0001 inches to 0.0004 inches wide.

7. In a nuclear reactor having a reactor core for producing heat, an intermediate heat exchanger and means for circulating a flow of coolant between the reactor and the heat exchanger, an emergency core cooling system for the removal of decay heat from the reactor core comprising:

(a) a second heat exchanger constructed of duplex tubing having an inner tube for containing a flow of liquid coolant and an outer tube concentric to the inner tube and spaced therefrom to form a sealed gap therebetween to reduce thermal conductivity between the inner and outer tubes, (b) a coolant loop disposed between the circulating means and the second heat exchanger to permit a flow of coolant parallel to the intermediate heat exchanger, the coolant continuously flowing through the loop by thermal convection, between the intermediate heat exchanger and the relatively cooler second heat exchanger, (c) a source of pressurized gas, including control means connected to the sealed gap in the duplex tubing for providing a thermally conductive gas to fill the gap, and (d) sensor means at the reactor for sensing a parameter indicative of a need for heat removal, said sensor means being connected to said control means for activating said control means to provide thermally conductive gas to the gap in the duplex tubing to increase heat transfer between the tubes and reduce the temperature of the coolant, thereby increasing the convective flow of coolant in the loop and increasing the removal of decay heat from the reactor.

8. The system of claim 7 wherein said coolant is liquid sodium, said sensor means is a liquid sodium temperature detector and said second heat exchanger is air cooled.

9. The system of claim 7 wherein said gap is approximately 0.0001 inches to 0.0004 inches wide.

* * * * *